(12) United States Patent
Van Lieu et al.

(10) Patent No.: US 7,315,954 B2
(45) Date of Patent: Jan. 1, 2008

(54) HARDWARE SWITCHING APPARATUS FOR SOFT POWER-DOWN AND REMOTE POWER-UP

(75) Inventors: James R. Van Lieu, Aloha, OR (US); Kory Q. Nguyen, Hazelwood, MO (US); Steven K. Boicourt, Hillsboro, OR (US)

(73) Assignee: Seiko Epson Corporation, Tokyo (JP)

( * ) Notice: Subject to any disclaimer, the term of this patent is extended or adjusted under 35 U.S.C. 154(b) by 1049 days.

(21) Appl. No.: 10/394,355

(22) Filed: Mar. 21, 2003

(65) Prior Publication Data

US 2004/0022184 A1 Feb. 5, 2004

Related U.S. Application Data

(60) Provisional application No. 60/400,621, filed on Aug. 2, 2002.

(51) Int. Cl.
*G06F 11/30* (2006.01)
(52) U.S. Cl. .................. 713/340; 713/310; 714/24
(58) Field of Classification Search ................. 713/340, 713/310; 714/24
See application file for complete search history.

(56) References Cited

U.S. PATENT DOCUMENTS

| 5,923,099 | A | * | 7/1999 | Bilir | 307/64 |
| 5,939,799 | A | * | 8/1999 | Weinstein | 307/64 |
| 6,128,744 | A |   | 10/2000 | Wang |  |
| 6,269,450 | B1 | * | 7/2001 | Iwata et al. | 713/340 |
| 6,854,065 | B2 | * | 2/2005 | Smith et al. | 713/300 |

OTHER PUBLICATIONS

Intel ATX Specification, Version 2.01, Feb. 1997, p. 12.

* cited by examiner

*Primary Examiner*—Thuan Du
(74) *Attorney, Agent, or Firm*—Mark P. Watson

(57) ABSTRACT

The invention is a hardware switching apparatus for initiating a soft power-down and a remote power-up in a computer system. The apparatus includes a power supply, a switching device having a first switch position and a second switch position, a switching circuit, and a wiring harness for remotely controlling the switching circuit. The power supply senses the power delivered from a primary source and produces a power-down signal when the power is interrupted. When the switching device is in the first switch position, the switching circuit is adapted to cause the power supply to produce a power-down signal. When the switching device is in the second switch position, the switching circuit is adapted to cause the power supply to produce a start-up signal.

27 Claims, 4 Drawing Sheets

HARDWARE SWITCHING APPARATUS FOR SOFT POWER-DOWN AND REMOTE POWER-UP

This application claims the benefit of the provisional application Ser. No. 60/400,621, filed Aug. 2, 2002, entitled Hardware Switching Apparatus for Soft Power-Down and Remote Power-up, which is incorporated by reference in its entirety.

FIELD OF THE INVENTION

The present invention relates to a hardware switching apparatus for controlling a computer system, and particularly to a hardware switching apparatus for initiating a soft power-down and a remote power-up in a computer system that has as its power supply an uninterruptible power supply.

BACKGROUND OF THE INVENTION

Computer systems commonly provide a software power-down feature ("soft power-down"). Any data that may be stored in a volatile memory can be corrupted or lost if the power supplied to a computer is abruptly terminated (a "hard power-down"). The soft power-down feature prevents data stored in a non-volatile memory from being lost or corrupted by closing programs and files in an orderly manner, and terminating the power supplied to the computer system's circuits only after all of the data has been saved. The soft power-down feature is commonly invoked by issuing a command to the operating system. For example, the soft power-down command can be issued by selecting a "Turn Off Computer" option from a menu. Depending on the particular computer system, the soft power-down usually takes a minute or two to complete.

An uninterruptible power supply ("UPS") is commonly used in those computer systems in which it is critical to avoid corruption or loss of data due to an unanticipated hard power-down. The UPS is connected in series between a primary power source, such as a wall outlet, and the computer system. The UPS includes circuitry for monitoring the primary power source. The UPS immediately switches the load to a backup power source when it senses that the primary power source has failed. Typically, the backup power source is a battery that is capable of supplying power to the load for a limited period of time. A UPS generally includes a microprocessor or a logic circuit that causes the UPS to send a power-down signal to notify the operating system that the UPS is furnishing power from the backup power source. In response to the power-down signal, the computer system causes the operating system to execute a soft power-down. After a predetermined time period (that is longer than the maximum time required for the operating system to complete the soft power-down), the UPS stops furnishing power from the backup power source. The UPS typically supplies power for about 3 minutes after switching to the backup power source.

Power monitoring and protection software ("UPS Control Software") is available to work with a UPS. One such UPS Control Software program marketed as POWERCHUTE PLUS is available from American Power Conversion Corporation, West Kingston, R.I. and is apparently intended for use by a system administrator managing a number of distributed computer systems. An administrative computer running the UPS Control Software is coupled to the UPS. The UPS Control Software may include notification of impending shut down, power event logging, auto-restart upon power return, and battery conservation features. In addition, the UPS Control Software may provide automatic battery testing, power problem diagnosis, and may support the remote scheduling of shut downs and re-boots. Problems with the UPS Control Software include that the software provides many more functions than are needed for a simple application and that a second computer system is required to run the software. Thus, the use of the UPS Control Software to control a UPS may be unnecessarily complicated and expensive, especially if all that is needed is a means to prevent a hard power-down.

It is generally recognized that computer operating systems can be difficult to operate and require specialized knowledge or training. Moreover, as new versions of an operating system become available, there is a need for on-going training as the command or technique for performing a specific function frequently changes from one version to the next. For this reason, a user interface that hides the operating system from the user is often employed in special purpose computer systems as opposed to general purpose computer systems, such as a personal computer. A special purpose computer system that is designed to perform a single function or a limited set of functions will generally have software running on it that provides a simplified user interface. One example of a special purpose computer system is a portrait printing system. The portrait printing system employs a simplified user interface that permits editing and printing of images, but hides the operating system from the user. A problem with some special purpose computer systems is that the user interface does not provide for a soft power-down. Another problem with some special purpose computer systems is that the system may be enclosed in a cabinet making the computer's on/off switch inaccessible so that there may be no convenient way to power-up the system.

Accordingly, there is a need for a hardware switching apparatus for initiating a soft power-down and a remote power-up in a computer system that has as its power supply a UPS.

SUMMARY OF THE INVENTION

This invention is a hardware switching apparatus for initiating a soft power-down and a remote power-up in a computer system that preferably has an impending power failure port for receiving a power-down signal for signaling the computer system to perform a soft power-down, a start port for receiving a start-up signal for signaling the computer system to power-up, and has as its power supply a UPS. The UPS is adapted to (a) receive power from a primary power source, (b) sense the power delivered from the primary source, (c) produce a power-down signal in response to an interruption in the power from the primary source, and (d) provide the power-down signal to the impending power failure port of the computer system. The hardware switching apparatus includes a switching device having a first switch position and a switching circuit coupled to the switching device and said power supply. The switching circuit is adapted to cause the power supply to produce a power-down signal when the switching device is in the first switch position. In addition, the switching circuit is adapted to cause a power switch having a primary power source position and a backup power source position to switch to the backup source position when the switching device is in the first switch position. The hardware switching apparatus also includes a wiring harness for remotely controlling the switching circuit. The wiring harness is separate from the switching device and the switching circuit. Further, the switching device has a second switch position and the switching circuit is adapted to cause the power supply to produce a start-up signal when the switching device is in the second switch position.

The foregoing and other objects, features, and advantages of the invention will be more readily understood upon consideration of the following detailed description of the invention, taken in conjunction with the following drawings.

DETAILED DESCRIPTION OF A PREFERRED EMBODIMENT

Figure 1:
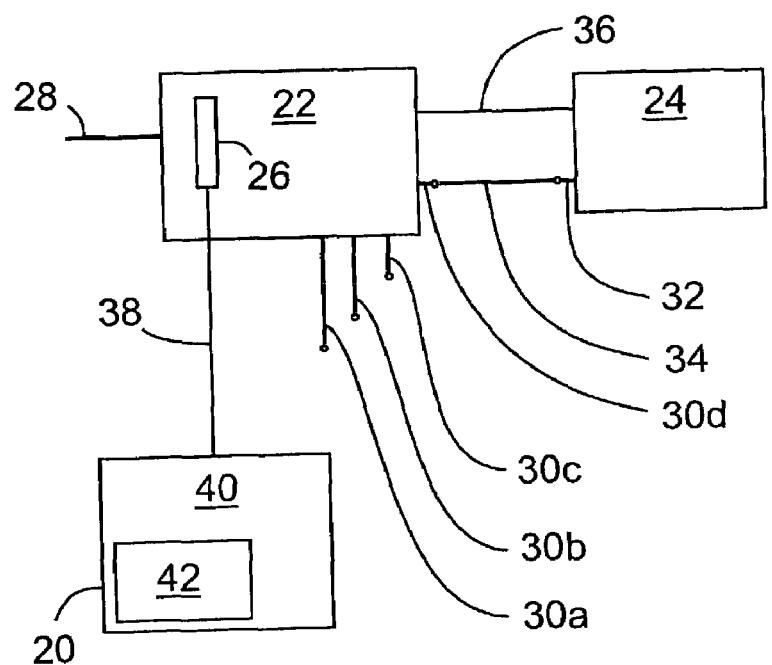
FIG. 1 is a block diagram of a prior art system for monitoring and controlling a UPS for supplying power to a computer system, including a UPS and an administrative computer running UPS control software.

Referring to FIG. 1, a prior art control and monitoring system 20 for controlling a UPS 22 that supplies power to a computer system 24 is shown. The UPS 22 typically has a relay I/O (input/output) card 26 that couples the UPS to optional devices. The UPS 22 has a power input 28 and power outputs 30*a*, 30*b*, 30*c*, and 30*d*. The power input 28 is coupled to a primary power source, such as a wall outlet. The UPS 22 supplies power from the power output 30*d* to a power input 32 of the computer system 24 through a power cable 34. The power outputs 30*a*, 30*b*, and 30*c* optionally supply power to peripheral devices or other computer systems. A first communications cable 36 is used to transmit signals between the UPS 22 and the computer system 24. A second communications cable 38 is used to transmit signals between the UPS 22 and the control and monitoring system 20. The control and monitoring system 20 includes a computer system 40 and UPS control software 42.

Figure 2:
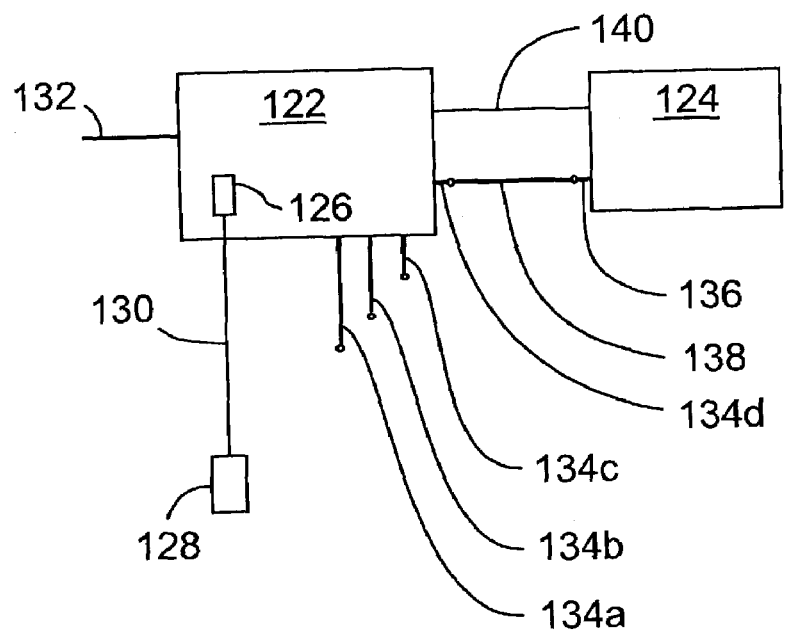
FIG. 2 is a block diagram of a hardware switching apparatus for soft power-down and remote power-up according to the present invention, including a UPS for supplying power to a computer system, a switching circuit, a switch harness, and a switching device.

Referring to FIG. 2, an exemplary hardware switching apparatus according to one preferred embodiment of the present invention is shown. FIG. 2 shows a UPS 122 that supplies power to a special purpose computer system 124. The UPS 122 preferably has a switching circuit 126 that couples the UPS 122 to a switching device 128 via a switch harness 130. The exemplary hardware switching apparatus preferably includes the switching circuit 126, the switching device 128, and the switch harness 130. In alternative embodiments, the switching circuit 126 and the UPS 122 are coupled by signals which are transmitted wirelessly (that is, sonically, optically, or by radio broadcast) and the switching apparatus includes one or more transmitters and receivers, as appropriate or desired. The UPS 122 has a power input line 132 and power outputs 134*a*, 134*b*, 134*c*, and 134*d*. The power input 132 is coupled to a primary power source, such as a wall outlet. The UPS 122 supplies power from the power output 134*d* to a power input 136 on the special purpose computer system 124 through a power cable 138. The power outputs 134*a*, 134*b*, and 134*c* optionally supply power to peripheral devices or other computer systems. A communications cable 140 is used to transmit signals between the UPS 122 and the special purpose computer system 124.

Figure 3:
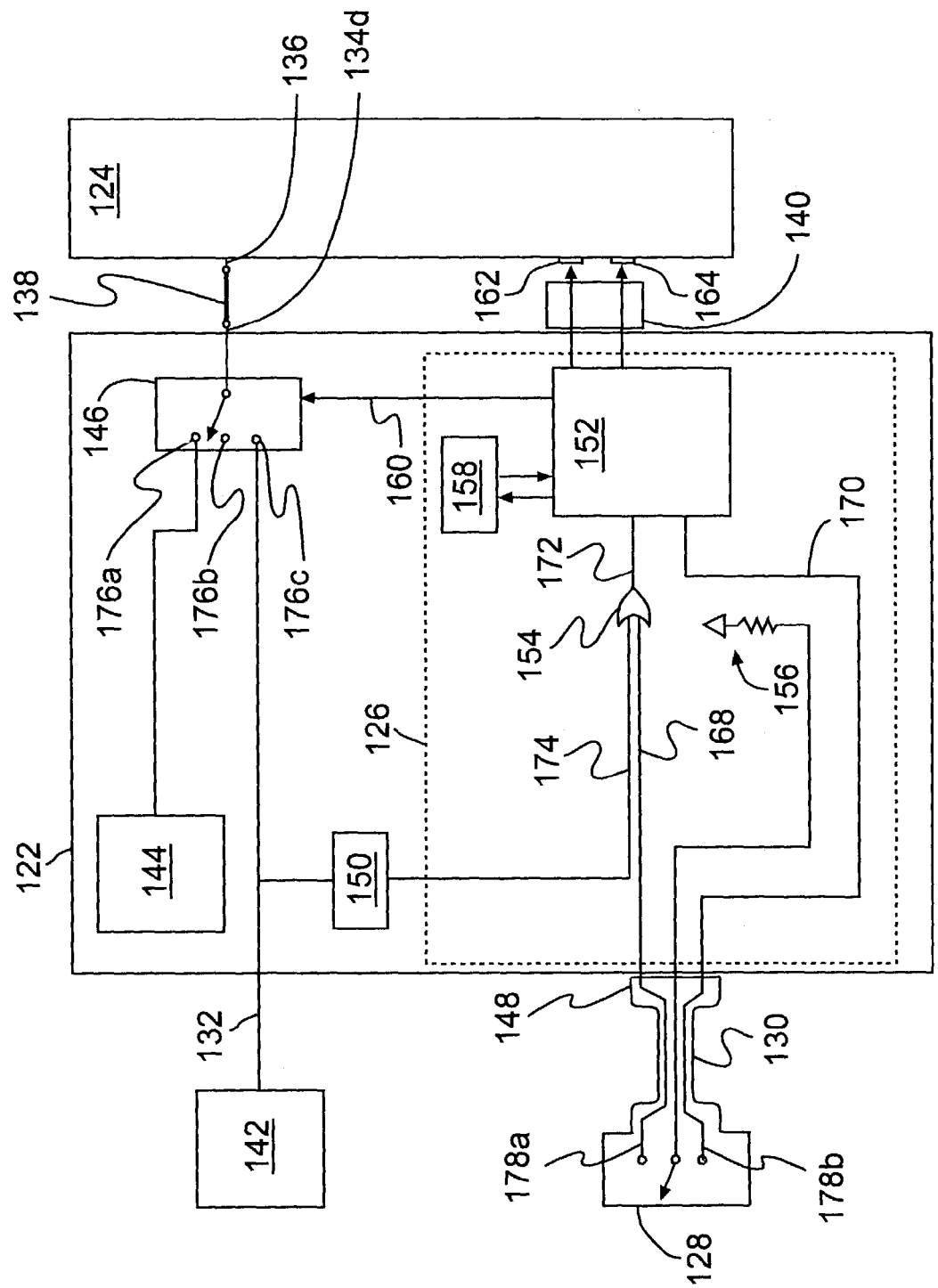
FIG. 3 is a block diagram of the switching circuit, the switch harness, and the switching device shown in FIG. 2.

Referring to FIG. 3, a primary power source 142, the special purpose computer system 124, and the UPS 122 are shown. The UPS 122 is coupled to both the computer system 124 and the primary power source 142. The UPS 122 is also coupled to a backup power source 144, which may be an internal component of the UPS, as shown. The UPS 122 includes a power switch 146 which is coupled to the primary and backup power sources 142, 144. The power switch 146 is also coupled to the computer system 124. The switching device 128, the switch harness 130, and the switching circuit 126 are also shown in FIG. 3. In addition, the switching circuit 126 is shown as an internal component of the UPS 122, though it need not be part of the UPS itself. The switching circuit 126 is coupled to the switching device 128 through the switch harness 130 and a connector 148. The switching circuit 126 is also coupled to a power monitor 150, the power switch 146, and the computer system 124. The power monitor 150 is for monitoring the power supplied on an input power line 132.

The switching circuit 126 includes UPS control logic 152, an OR gate 154, a signal power source 156, and a timer 158. The UPS control logic 152 is coupled to the power switch 146 through signal line 160 and to the computer system 124. The computer system 124 has an impending power failure port 162 and a start port 164. The UPS control logic 152 is directly coupled to these ports through the communications cable 140 in one embodiment. The UPS control logic 152 may alternatively be coupled to one or more components of the UPS that, in turn, are coupled to these ports. In addition, the UPS control logic 152 is coupled to the timer 158. The UPS control logic 152 is coupled to the switching device 128 by signal line 170 and to the output of the OR gate 154 by signal line 172. The OR gate 152 has for one of its inputs a signal line 174 coupled to the power monitor 150 and for its other input the signal line 168, which is coupled to switching device 128. The switching device 128 is also coupled to the signal power source 156.

Soft Power-Down—Power Interruption

When the power monitor 150 detects that power is no longer flowing at an appropriate level in the power line 132, it sends a "power fail" signal through the OR gate 154 to the UPS control logic 152. The power fail signal causes the control logic 154 to send a control signal to the power switch 146 causing the power switch to move to the 176*a* position, a position at which power is supplied to the special purpose computer system 124 from the backup power source 144. In addition, the power fail signal causes the control logic 152 to send a power-down signal to the impending power failure port 162 of the special purpose computer system 124. Asserting a power-down signal on the impending power failure port 162 causes the operating system to initiate a soft power-down. The power-down signal also causes the control logic 152 to start the timer 158.

The timer 158 counts off a predetermined time period and sends a timer signal to the control logic 152 at the end of the period. The control logic 152, in turn, preferably generates a control signal that causes the power switch 146 to move to switch position 176*b*. Neither the primary power source 142 nor the backup power source 144 is coupled to the special purpose computer system 124 when the power switch 146 is set to power switch position 176*b*. In an alternative preferred embodiment, at the end of the predetermined time period, the control logic 152 generates a control signal that causes the power switch 146 to move to switch position 176c, a position at which the primary power source 142 can supply power to the special purpose computer system 124.

Soft Power-Down by User

To cause a soft power-down, the switching device 128 is moved to the 178a position, a position which causes the switching circuit 126 to send a power-fail signal through the OR gate 154 to the control logic 152. It may be sufficient to momentarily move the switching device 128 to the 178a position, or it may be necessary to move the switching device 128 so that it permanently remains in the 178a position. As with a soft power-down that is caused by a power supply interruption, the power fail signal causes the control logic 152 to send a power-down signal to the impending power failure port 162 of the computer system 124. (Alternately, the UPS control logic 152 sends a signal to a component of the UPS that, in turn, sends the power fail signal to the impending power failure port 162.) As before, this causes the system 124 to initiate a soft power-down. After some predetermined time, the UPS 122 stops supplying power from the backup power source 144 in the same manner as that described above for a soft power-down caused by a power supply interruption.

Remote Power-Up

To cause a remote power-up, the switching device 128 is moved to the 178b position which causes the switching circuit 126 to send a start signal to the control logic 152. It may be sufficient to momentarily move the switching device 128 to the 178b position, or it may be necessary to move the switching device 128 so that it remains permanently in the 178b position. In response to the start signal, the control logic 152 sends a control signal to the power switch 146 that preferably causes it to move to position 176c, a position at which power from the primary power source 142 is supplied to the special purpose computer system 124. The special purpose computer system 124 preferably initiates a power-up when it receives power on the power cable 138.

Some types of computers, however, do not initiate a power-up when they receive power on power cable 138. In one alternative embodiment for causing a remote power-up, the placing of the switching device 128 in the 178b position causes the switching circuit 126 to send a start signal to the control logic 152. The start signal causes the control logic 152 to send a start-up signal to the start port 164 of the computer system 124. This causes the computer system 124 to initiate a power-up. (Alternately, the UPS control logic 152 sends a signal to a component of the UPS that, in turn, sends a start-up signal to the start port 164.) In addition, in response to the start signal, the control logic 152 sends a control signal to the power switch 146 that causes it to select switch position 176c, a position at which power is supplied to the special purpose computer system 124 from the primary power source 142.

Switch Harness

Figure 4:
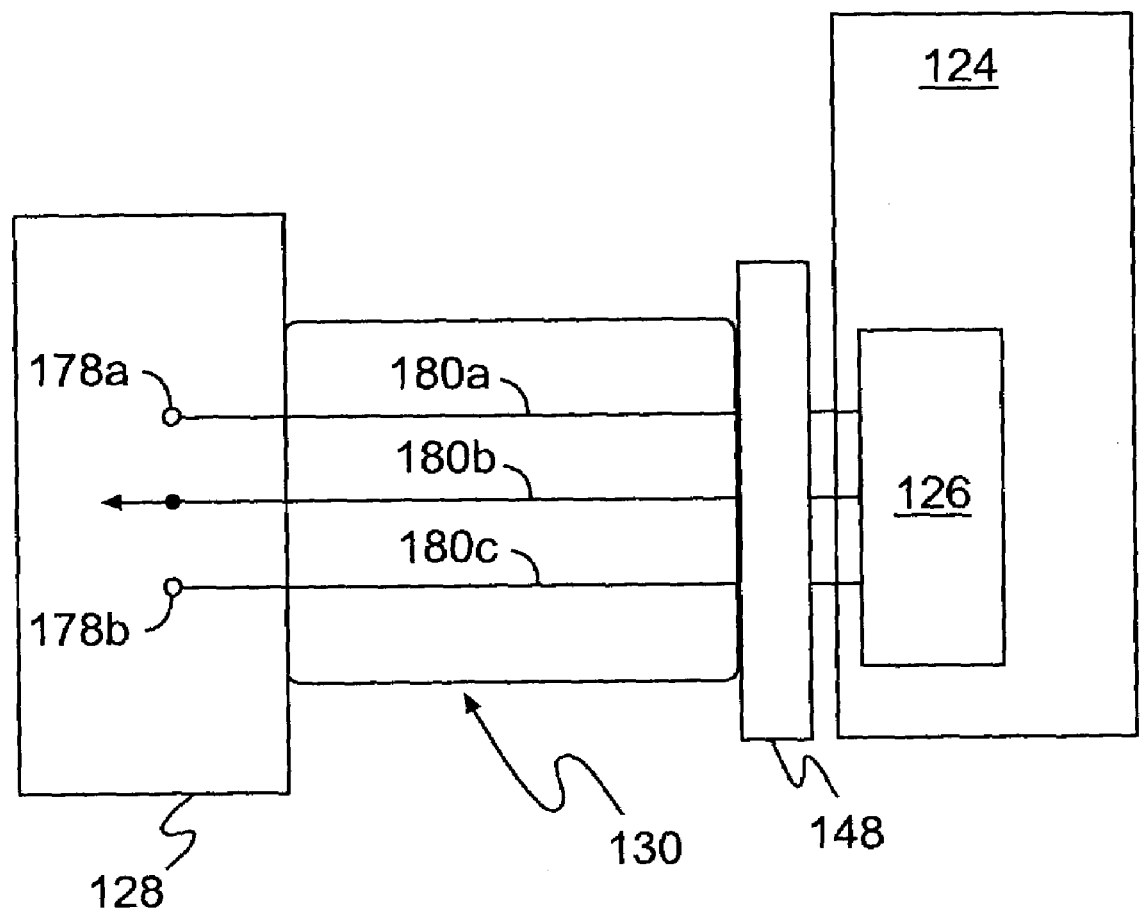
FIG. 4 is a schematic of the switch harness shown in FIG. 3.

Referring to FIG. 4, a schematic of the switching device 128 and the switch harness 130 are shown. The UPS 124 and the switching circuit 126 are also shown. In one preferred embodiment, the switch harness 130 has three wires 180a, 180b, 180c that are coupled at one end to the switching device 128 and at an opposite end through the connector 148 to the switching circuit 126. In an alternative preferred embodiment, the switch harness 130 has a conductive shield that encloses the three wires 180a, 180b, 180c in order to reduce electromagnetic interference. In yet another preferred embodiment, the switch harness 130 includes a ferrite core for reducing electromagnetic interference. The ferrite core surrounds one section of the three wires 180a, 180b, 180c.

The soft power-down and the remote power-up disclosed here are preferably made remotely, but may be made non-remotely. The degree of remoteness is established by the length of switch harness 130. In one preferred embodiment, the length of the switch harness 130 is about two feet, though it may be longer or shorter.

Computer System Enclosure

Figure 5:
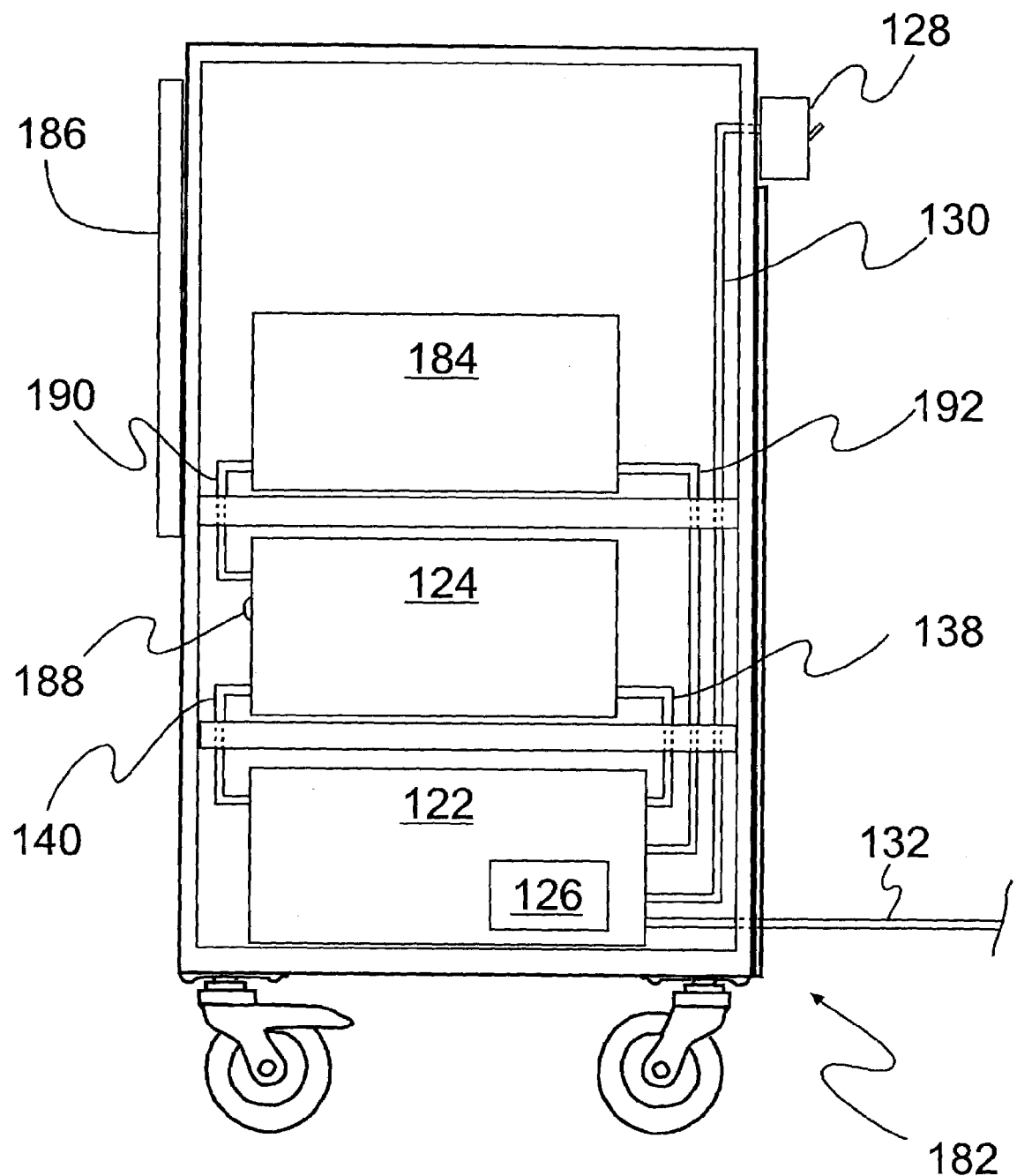
FIG. 5 is a diagram showing a cut-away side view of an exemplary enclosure for a special purpose computer system.

Referring to FIG. 5, a cut-away side view of an exemplary enclosure 182 for holding a special purpose computer system is shown. The special purpose computer system 124, the UPS 122, and a peripheral device 184 are contained within the enclosure 182. An access door 186 provides convenient access to the peripheral device 184. However, it is generally not possible to conveniently access the computer system 124 or the UPS. Similarly, it is generally not possible to conveniently access an on/off switch 188 for the computer system 124. As shown in FIG. 5, the switching device 128 is accessible on a side of the enclosure 182 opposite the door 186. The switching device 128 is connected to the switching circuit 126 by switch harness 130. The power-down and start-up signals are sent to the computer system 124 through communications cable 140. The computer system 124 is supplied power by power cable 138. The computer system 124 communicates with peripheral device 184 through cable 190. The peripheral device 184 receives power from the UPS 124 on a second power cable 192.

Preferably, the communications cable 140 is configured as a 9 pin serial port cable, having busy, standby, rxd, txd, power, ground, and other lines. Alternatively, the communications cable 140 is a Universal Serial Bus ("USB") cable. In an alternative preferred embodiment, the communications cable 140 is a parallel port cable.

The switching device 128 is preferably located on the back of the special purpose computer system enclosure 182. However, the switching device 128 may be placed in any desired location. The switching device 128 disclosed herein is preferably a single switch, such as the SPDT SWITCH NKK JWL 12BAA-A single pole double pole throw switch. However, it is contemplated that two switches may be employed instead of a single switch.

The hardware switching apparatus for a soft power-down and remote power-up disclosed here provides for softly powering-down a special purpose computer system running user interface software that does not provide a soft power-down feature. The hardware switching apparatus also provides for remotely powering-up a special purpose computer in which the computer's on-switch is inaccessible. However, it is not essential that an embodiment of the present invention include both features. In one preferred embodiment, the hardware switching apparatus only provides for softly powering-down a special purpose computer system running user interface software that does not provide a soft power-down feature. In an alternative preferred embodiment, the hardware switching apparatus only provides for remotely powering-up a special purpose computer in which the on-switch is inaccessible.

While the present invention has been described for use with a special purpose computer system, it may be used with any computer system or device in which the soft power-down and remote power-up features provide a benefit. Specifically, the present invention may advantageously be employed with a general purpose computer system.

While the switching circuit 126 has been described as sending power fail and start signals to the UPS control logic 152, other configurations are contemplated. For example, the switching circuit 126 may be adapted to interface to the power monitor 150, controlling it so as to cause it to send a power fail signal to the control logic 152. Alternatively, the switching circuit 126 may be adapted to control the power supplied on power line 132. By cutting off power on the power line 132, the switching circuit 126 will cause the UPS 122 to send a power-down signal to the special purpose computer system 124 thereby remotely causing a soft power-down.

The terms and expressions which have been employed here are used as terms of description and not of limitation. There is no intention to use any term or expression so as to exclude any equivalent of the features shown and described or portions thereof. The scope of the invention is defined and limited only by the following claims.

The invention claimed is:

1. A hardware switching apparatus for a soft power-down of a computer system having a first port for receiving a power-down signal for signaling the computer system to perform the soft power-down and a second port for receiving a start-up signal for signaling the computer system to start up, comprising:
    a switching circuit;
    a power supply for powering the computer system, the power supply to (a) receive power from a primary power source, (b) sense the power delivered from the primary source, (c) produce a first power-down signal in response to an interruption of the power from the primary source, and (d) provide the first power-down signal to the switching circuit; and
    a switching device distinct from the power supply, the switching device having a first switch position;
    wherein the switching circuit is coupled with the switching device, and the switching circuit (a) provides the first power-down signal to the first port, and (b) provides a second power-down signal to the first port in response to the switching device being in the first switch position.

2. The switching apparatus of claim 1, wherein the switching device has a second switch position, and the switching circuit produces the start-up signal in response to the switching device being in the second switch position.

3. The switching apparatus of claim 2, further comprising a backup power source, wherein the power supply includes a power switch having a backup source position, a primary source position, and a third position, the power supply to supply power from the backup power source when the power switch is in the backup source position, to supply power from the primary source when the power switch is in the primary source position, and to not supply power when the power switch is in the third position.

4. The switching apparatus of claim 3, wherein the switching circuit causes the power switch to switch to the backup source position in response to an interruption of the power from the primary source.

5. The switching apparatus of claim 3, wherein the switching circuit causes the power switch to switch to the third position in response to the switching device being in the first switch position.

6. The switching apparatus of claim 3, wherein the switching circuit causes the power switch to switch to the primary source position in response to the switching device being in the second switch position.

7. The switching apparatus of claim 2, wherein the switching device is momentarily in the second switch position.

8. The switching apparatus of claim 2, wherein the switching circuit provides the start-up signal to the second port of the computer system.

9. The switching apparatus of claim 1, wherein said switching device is momentarily in the first switch position.

10. The switching apparatus of claim 1, wherein, for remotely controlling the switching circuit, the switching device is coupled with the switching circuit through a wiring harness separate from the switching device and the switching circuit.

11. The switching apparatus of claim 10, wherein the wiring harness further comprises a conductive shield for reducing electromagnetic interference.

12. The switching apparatus of claim 10, wherein the wiring harness further comprises a ferrite core for reducing electromagnetic interference.

13. The switching apparatus of claim 1, wherein, for remotely controlling the switching circuit, the switching device and the switching circuit are coupled through the agency of wirelessly transmitted signals.

14. The switching apparatus of claim 1, wherein the switching device is switchable by a user.

15. A computer system comprising:
    an enclosure having a first interior portion that is inaccessible to a user of the computer system;
    a computer disposed within the first interior portion and having a first port for receiving a power-down signal, the computer to perform a soft power-down in response to receiving the power-down signal;
    a switching circuit;
    a power supply to power the computer, the power supply to (a) receive power, (b) detect an interruption of the power received and (c) provide to the switching circuit, in response to detecting an interruption of the power received, a first power-down signal; and
    a switching device that is distinct from the power supply, disposed in a location that is accessible to the users and which has a first switch position,
    wherein the switching circuit is coupled with the switching device, and (a) provides the first power-down signal to the first port, and (b) provides a second power-down signal to the first port in response to the switching device being in the first switch position.

16. The computer system of claim 15, wherein the switching device has a second switch position, and the switching circuit produces a start-up signal in response to the switching device being in the second switch position.

17. The computer system of claim 16, wherein the switching circuit provides the start-up signal to a start port of the computer.

18. The computer system of claim 15, further comprising a backup power source, wherein the power supply provides power to the computer from the backup power source in response to detecting an interruption of the power received.

19. The computer system of claim 15, wherein the switching device is switchable by the user.

20. The computer system of claim 15, wherein the enclosure includes a second interior portion accessible by the user, further comprising a peripheral device disposed within the second interior portion.

21. A method softly powering down a computer system for comprising the steps of:
    generating a first power-down signal in response to a switching device being placed in a first switch position, the switching device being accessible to a user; and causing a power supply to provide the first power-down signal to a computer, wherein the power supply receives power, detects an interruption of the power received, and provides a second power-down signal to the computer in response to an interruption of the power received.

22. The method of claim 21, wherein the power supply is caused to provide the first power-down signal to the computer notwithstanding that the power supply does not detect an interruption of the power received.

23. The method of claim 21, wherein the computer includes an operating system, further comprising a system of causing the operating system to initiate a soft power-down.

24. The method of claim 23, wherein the operating system is inaccessible to the user.

25. The method of claim 21, further comprising a step of providing a start-up signal to the computer in response to the switching device being placed in a second switch position.

26. The method of claim 25, wherein the computer includes an operating system, further comprising a step of causing the operating system to start up the computer.

27. The method of claim 26, wherein the operating system is inaccessible to the user.

* * * * *